Sept. 14, 1926.  1,599,921
A. E. RADKE ET AL
SHIPPING BLOCK FOR AUTOMOBILE WHEELS
Filed July 13, 1925

Inventors:
Alois E. Radke
Erwin H. Pretzka
By Young & Young
Attorneys

Patented Sept. 14, 1926.

1,599,921

UNITED STATES PATENT OFFICE.

ALOIS E. RADKE AND ERWIN H. DRETZKA, OF CUDAHY, WISCONSIN.

SHIPPING BLOCK FOR AUTOMOBILE WHEELS.

Application filed July 13, 1925. Serial No. 43,332.

This invention relates to shipping blocks for automobile wheels.

In shipping automobiles, it is the usual practice to provide wooden blocks which are channeled out to fit the curvature of the wheels and are of substantially triangular shape. One of these blocks is positioned on each side of the wheel and is nailed to the floor of the freight car. Obviously, in nailing these blocks in position it is only possible to tack them down by nails positioned in a slanting manner through the block.

It has been found in actual practice that these blocks pull loose from their insecure fastenings and allow the automobile to slip out of place. Further, the construction of these wooden blocks is rather expensive and they are usually so damaged after one use that they are not again used, but are thrown away.

This invention is designed to overcome the defects noted above, and objects of such invention are to provide shipping blocks for automobile wheels which are formed of sheet metal, and which are not damaged when in use, but may be used over and over.

Further objects are to provide shipping blocks for automobile wheels which automatically lock themselves to the freight car floor and cannot pull loose from their attachment to the floor.

Further objects are to provide a novel form of shipping block in which each pair of blocks is securely braced by transversely positioned bracing members located on opposite sides of the wheel, and in which a very rigid construction is attained thus eliminating all possibilty of loosening of the automobile from its moorings.

An embodiment of the invention is shown in the accompanying drawings, in which:—

Figure 1:
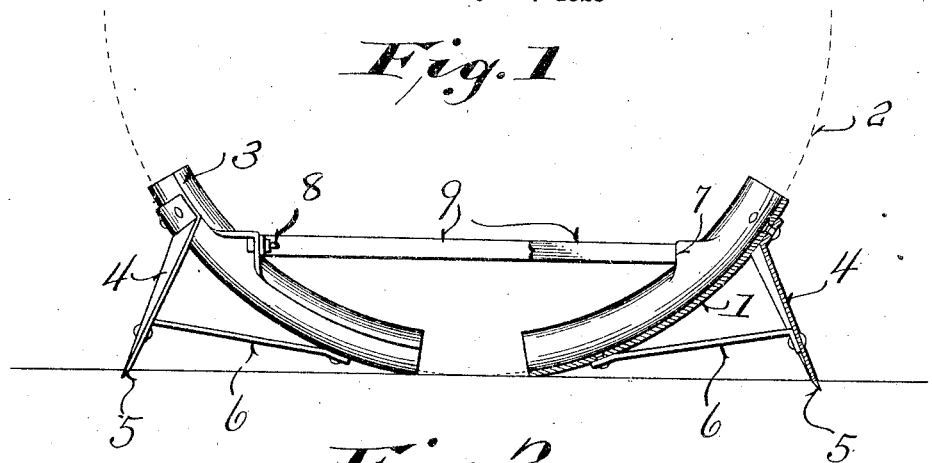
Figure 1 shows a pair of blocks in position with one of the blocks in section and the outline of the automobile wheel shown in dotted lines.
Figure 2:
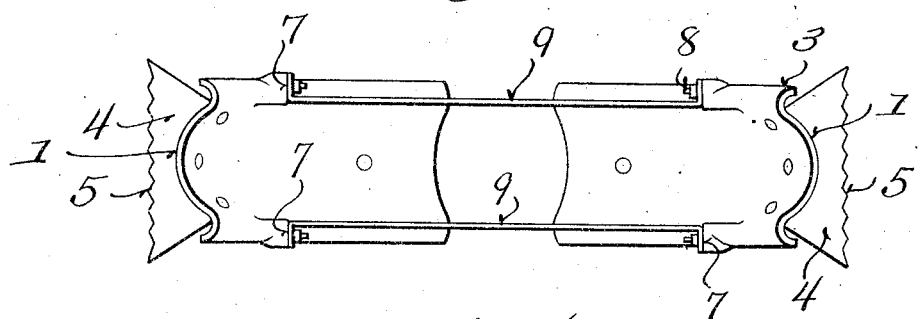
Figure 2 is a plan view of the structure shown in Figure 1.
Figure 3:
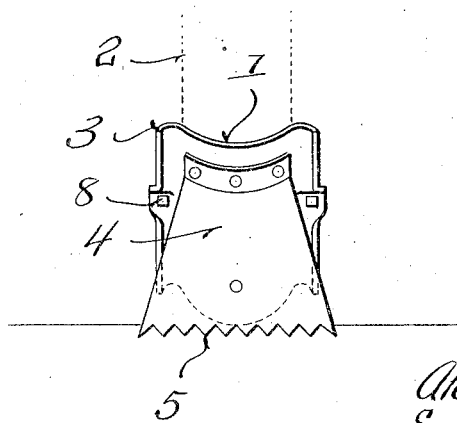
Figure 3 is an end view of one of the blocks.

Referring to the drawings, it will be seen that the blocks are of duplicate construction and each is provided with a channeled body portion 1 which is curved to fit the contour of the automobile wheel 2. This body portion is provided with rearwardly projecting marginal flanges 3 to increase its rigidity and strength. Each of these members 1 is provided with a rearwardly and downwardly slanting foot 4 which is equipped with pointed, serrated projections 5 at its lower edge adapted to dig into the floor of the freight car. Preferably, these feet 4 are flared outwardly to get a more secure grip upon the floor and, if desired, may be slightly bowed, as shown in Figure 1, to increase their stiffness. They are joined by means of a brace member 6 with a portion of the body 1, to thus produce a very rigid and secure construction. Each of the flanges 3 is provided with an offset flat projecting face 7 which is pressed outwardly from the flange, as indicated, and which is apertured to receive attaching bolts 8. A pair of tie rods or straps 9 are provided with outwardly turned ends apertured to receive the bolts 8.

By means of this construction each side of each of the blocks is tied to the adjacent block and separating of the blocks is prevented. Further than this, the serrated, pointed feet 4 dig into the floor of the freight car and prevent any shifting whatsoever of the device.

It will be seen that shipping blocks for automobile wheels have been provided which do not require nailing to the floor of the freight car or other securing means, but which will automatically lock themselves to the floor of the car in a very secure and reliable manner.

Further, it will be seen that no damage whatsoever to these blocks results during use and that they may be used over and over with obvious saving.

It will be seen further that these blocks may be very cheaply constructed from sheet metal by ordinary punch press methods, and that the expense of manufacturing such blocks will be relatively small.

Although the invention has been described in considerable detail, it is to be understood that the invention may be variously embodied and is, therefore, to be limited only as claimed.

We claim:

The combination of a vehicle wheel, of a pair of blocks positioned on opposite sides of such wheel and adapted to rest upon a support, each of said blocks having a channelled body portion and having an outwardly and downwardly projecting foot provided with securing prongs at its outer end, said foot being rigidly secured directly to said channel portion, and a brace joining such foot to the body portion of each of the blocks, and tie rods extending between said blocks and positioned on opposite sides of the vehicle wheel, said channel portions, feet and braces being formed of sheet metal and being permanently secured together.

In testimony that we claim the foregoing we have hereunto set our hands at Cudahy, in the county of Milwaukee and State of Wisconsin.

ALOIS E. RADKE.
ERWIN H. DRETZKA.